United States Patent [19]

Sansone

[11] Patent Number: 4,698,971
[45] Date of Patent: Oct. 13, 1987

[54] CONTROL DEVICE FOR A TWIN MASTER CYLINDER

[75] Inventor: Serge Sansone, Breuillet, France

[73] Assignee: Bendix France, Paris, France

[21] Appl. No.: 827,134

[22] Filed: Feb. 6, 1986

[30] Foreign Application Priority Data

Feb. 20, 1985 [FR] France ................................ 85 02463

[51] Int. Cl.⁴ .............................................. F15B 7/00
[52] U.S. Cl. ................................... 60/581; 74/471 R; 74/512
[58] Field of Search ................ 60/581, 594, 546, 551, 60/533; 74/471 R, 512

[56] References Cited

U.S. PATENT DOCUMENTS

| 3,444,691 | 5/1969 | Shimada . | |
|---|---|---|---|
| 3,724,210 | 4/1973 | Kobashi | 60/581 |
| 3,888,547 | 6/1975 | Ron | 60/581 |
| 4,026,109 | 5/1977 | Fay | 60/581 |
| 4,218,887 | 8/1980 | Dauvergne | 60/551 |
| 4,305,251 | 12/1981 | Dauvergne | 60/551 |

FOREIGN PATENT DOCUMENTS

| 305791 | 3/1973 | Austria . |
| 532727 | 11/1954 | Belgium . |
| 1480011 | 7/1969 | Fed. Rep. of Germany . |
| 1655266 | 1/1971 | Fed. Rep. of Germany . |
| 2745514 | 4/1978 | Fed. Rep. of Germany . |
| 1146933 | 11/1957 | France . |
| 206502 | 8/1939 | Switzerland . |
| 1054824 | 3/1976 | United Kingdom . |
| 1429000 | 3/1976 | United Kingdom . |

*Primary Examiner*—Abraham Hershkovitz
*Attorney, Agent, or Firm*—Larry J. Palguta; Ken C. Decker

[57] ABSTRACT

Control device (10) for a twin master cylinder (18) of the type with two master cylinders situated side by side and parallel to each another; the device (10) being capable of being positioned between an actuating pedal (12) and pistons (26, 26') of the master cylinders. According to the invention the device (10) incorporates a twin beam (36) ensuring balancing of the forces applied to each of the pistons (26, 26') while ensuring the rigidity of the control device (10), and the twin beam (36) incorporates a device for maintaining the separation of the points of application (32, 32') of the forces on the pistons (26, 26').

4 Claims, 6 Drawing Figures

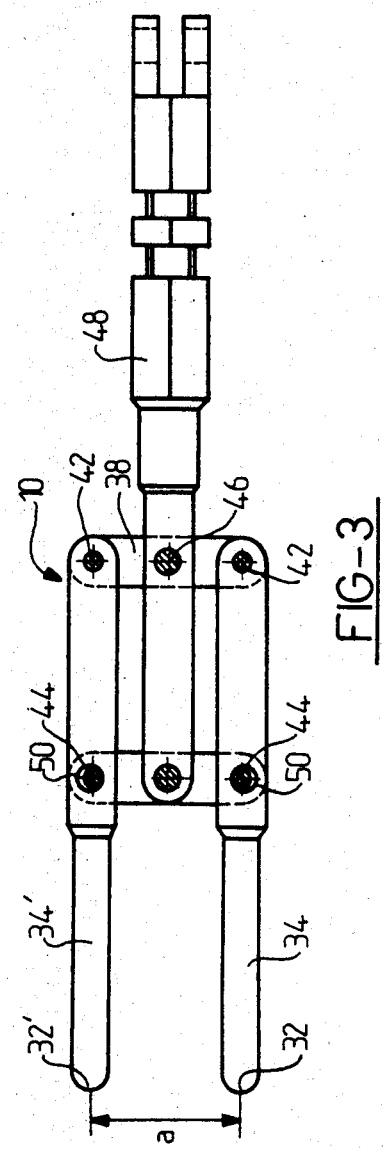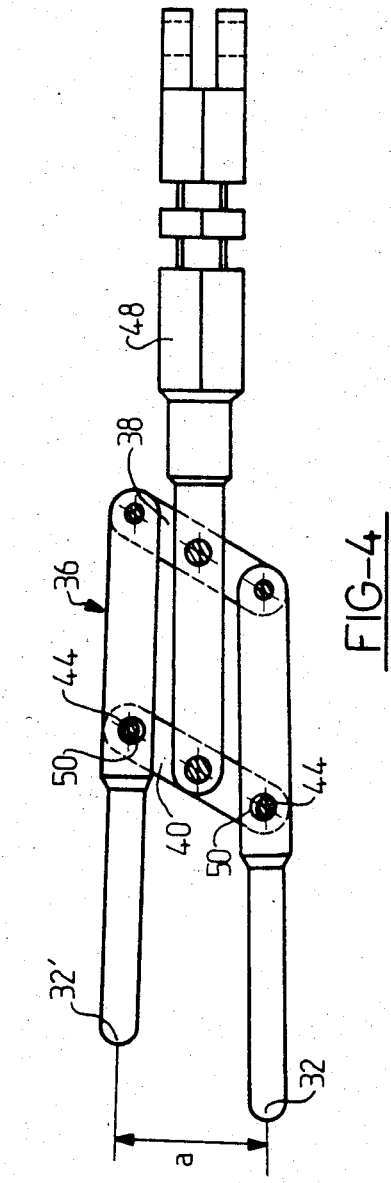

CONTROL DEVICE FOR A TWIN MASTER CYLINDER

The invention relates to a control device for a twin master cylinder particularly for a motor vehicle. The invention more particularly concerns a control device for a twin master cylinder of the type with two master cylinders situated side by side and parallel to each another, the device being capable of being positioned between an actuating pedal and pistons of the master cylinders.

In this type of installation, the master cylinder is fixed to a fixed portion of the vehicle and the pedal is hinged relative also to a fixed portion of the vehicle. The control device situated between this pedal and the master cylinder, must be able to ensure the transmission of forces without intermediate guidance, and therefore the control device must be rigid. If such a control device is constructed as a single solid component incorporating firstly an attachment to the pedal and secondly two parallel push rods which are capable of actuating pistons of the master cylinders, such a system has the major disadvantage of preventing any operation of the master cylinder if one of the pistons is seized in its bore. To overcome this disadvantage a beam can be incorporated in the control device with the disadvantages, however, not only of imposing guidance on the push rods to ensure their parallelism at the same distance between axes as the distance between axes of the pistons but also the control rod positioned on the same side as the pedal must likewise be guided. This multiple guidance is difficult to achieve taking into account the large number of tolerances to be taken into consideration in a region of the vehicle which does not lend itself well to this type of guidance, more precisely in the region of the bulkhead of the engine compartment of the vehicle. The construction of a twin beam may be considered to resolve the problem of guidance, which ensures permanent parallelism between firstly the push rods, and secondly the control rod, which effectively ensures both the rigidity of the control and correct operation in the case of seizure of one of the pistons. However, this solution has the major disadvantage that the distance between axes of the two push rods, which remain parallel, changes when the beam is brought into operation, whereas the distance between axes of the pistons is constant. This prevents correct operation of the control in the case of failure of one of the circuits or in the case of seizure of one of the pistons.

The aim of the invention is to propose a control device operating in all cases illustrated, constructed in an economical manner and not having the disadvantages cited above.

For this purpose the invention proposes a control device for a twin master cylinder, of the type with two master cylinders situated side by side and. parallel to one another, the device being capable of being positioned between an actuating pedal and pistons of the master cylinders, characterized in that the device incorporates a twin beam ensuring balancing of the forces applied to each of the pistons while ensuring the rigidity of the control device and in that the twin beam incorporates a device for maintaining the separation of the points of application of the forces on the pistons.

It will be understood that owing to such a construction, the twin beam provides all the desired functions when the device for maintaining the separation allows the push rods, and more precisely their ends which cooperate with the pistons of the master cylinders, to maintain a separation which is identical to the distance between axes of the pistons of the master cylinders.

Other characteristics and advantages of the control device, the subject of the present invention, will emerge from the following description of two embodiments, given by way of illustration but not limiting in any way, with reference to the accompanying drawings in which:

FIG. 3 is an enlarged view of the control device shown in FIG. 2 showing this device at rest;

FIG. 4 is a view similar to that shown in FIG. 3 in which the beam is brought into operation;

Figure 1:
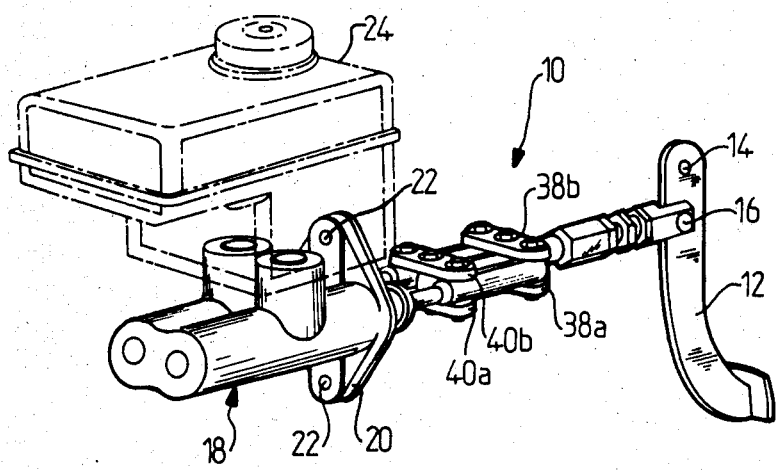
FIG. 1 is a perspective view of the control device which is the subject of the invention positioned between a twin master cylinder and a brake pedal.

FIG. 1 shows in perspective a control device for a twin master cylinder given as an assembly the reference 10 and positioned between a brake pedal 12 which is capable of being mounted so as to be hinged to a fixed portion of the vehicle (not shown) by means of a hole 14 which is capable of housing a support shaft. The connection between the control device 10 and the pedal 12 is provided by a shaft forming a pivot 16 passing through corresponding holes formed in the control device 10 and the pedal 12. At its other end the control device cooperates with a master cylinder given as an assembly the reference 18 and which is capable of being fixed to a fixed portion of the vehicle (not shown) by means of a fixing flange 20 incorporating fixing holes 22. In a conventional manner the master cylinder 18 is supplied with brake fluid by means of a reservoir given as an assembly the reference 24 and shown symbolically in FIG. 1.

Figure 2:
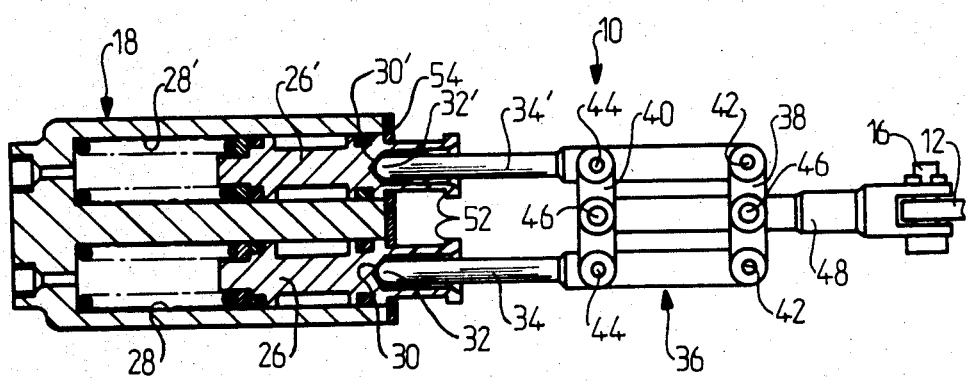
FIG. 2 is a view in partial section of the device shown in FIG. 1.

Referring to FIGS. 1 and 2, it is seen that the master cylinder 18 is of the twin type with two single master cylinders situated side by side and parallel to each another. Each of these master cylinders incorporates a piston (26,26') which is capable of sliding in a bore (28,28') formed in the body of the master cylinder. Each of the pistons has at its end on the same side as the control device a cavity (30,30') with a spherical bottom with which a spherical end (32,32') of each of two push rods (34,34') cooperates. The two push rods 34 and 34' are joined together by a twin beam 36 formed by two connecting components 38 and 40 which are spaced axially apart and are hinged to each of the push rods by shafts forming pivots 42 and 44 respectively. Each of these connecting components 38 and 40 is also hinged at its middle by means of a shaft forming a pivot 46 to a control rod 48 which is capable of being connected to a pedal 12 by means of a shaft forming a pivot 16.

Referring to FIGS. 3 and 4 in which only the control device is shown, a partial section shows that although the shafts forming pivots 42 and 46 are mounted without clearance in the corresponding bores formed in the push rods 34 and 34', the connecting component 38 and the control rod 48, the same does not apply to the shafts forming pivots 44 which are housed in holes 50 of a diameter which is larger than the diameter of the shafts 44. It will be noted that when the ends 32 and 32' are spaced apart by a distance "a" which corresponds to the distance between the axes of the pistons 26 and 26' of the master cylinders 18, the shafts 44 are in contact with the inside edges of the holes 50, where the inside edges are understood to mean the edges which are situated nearest the control rod 48. Referring to FIG. 4, it is seen that if one of the pistons 26 or 26' moves more slowly than the other, in this case it is the piston 26' which is less advanced than the piston 26, the twin beam 36 is brought into operation, that is to say that the connecting components 38 and 40 become inclined relative to the control rod 48 and the shafts 44 move to the out-side of the holes 50 while retaining contact with the edges which allows the ends 32 and 32' to maintain the separation "a" defined by the cavities 30 and 30' formed in the pistons 26 and 26'. The holes 50 in association with the shafts forming pivots 44 and the cooperation of the spherical ends 32 and 32' with the cavities with spherical bottoms 30 and 30' form a device for maintaining the separation of the points of application of the forces on the pistons.

It is seen that owing to this construction, as the shafts 40 are always in contact with the edges of the holes 50 the assembly of the control device 10 remains rigid, that is to say it remains as a whole in alignment with the control rod 48 without requiring any bearing or intermediate guidance.

Figure 5:
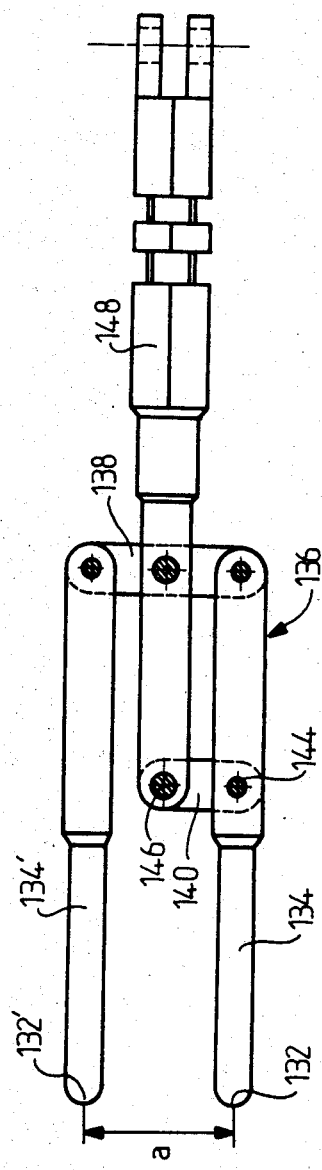
FIG. 5 is a view similar to that shown in FIG. 3 for a second embodiment.
Figure 6:
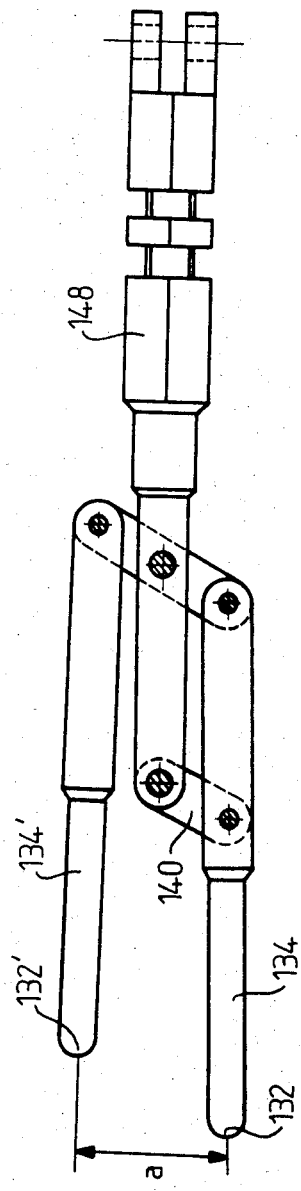
FIG. 6 is a view similar to that shown in FIG. 4 for the second embodiment.

Referring to FIGS. 5 and 6 which show a second embodiment of the invention, the same components fulfilling the same function carry the same reference number increased by a hundred. In this embodiment, the essential difference compared with the preceding embodiment lies in the connecting component 140 which is only hinged to the control rod 148 and to a single push rod 134 by means of two shafts 146 and 144. It will be noted that in this embodiment, the shaft forming a pivot 144 is mounted without clearance on the connecting component 140. Thus a twin beam is obtained which ensures parallelism of the control rod 148 and the push rod 134, the push rod 134' being free to become inclined relative to the push rod 148, as shown more particularly in FIG. 6, in such a way as to maintain the distance "a" between the ends 132 and 132' of the rods 134 and 134' respectively.

It is seen therefore, that owing to the invention a control device is obtained which is simple, of reduced cost, ensuring proper operation of the control device without requiring special guidance between the control pedal associated with a portion of the vehicle and the master cylinder associated with another portion of the vehicle, and consequently all problems of intermediate guidance or of alignment are eliminated owing to the construction of the invention.

It will also be noted referring to FIG. 1 that the connecting components 38 and 40 are formed by two components 38a and 38b on the one hand and 40a and 40b on the other hand which are identical in pairs and are positioned on each side of the control rod and of the push rods, this avoiding the shafts operating with an overhang. It will also be noted that the ends of the pistons 26 and 26' incorporate collars 52 which are capable of coming to bear against a component 54 which is firmly fixed to the body of the master cylinder 18 thus limiting the travel of the pistons 26 and 26'. The clearance required between the shafts 44 and the corresponding holes 50 is defined as a function of this maximum travel of the pistons 26 and 26' so as to enable the distance between the ends 32 and 32' to be maintained in all extreme conditions.

I claim:

1. A control device for a twin master cylinder of the type having two master cylinders situated side by side and parallel to one another, the control device positioned between an actuating pedal and piston of the master cylinders, characterized in that the control device includes twin beams which ensure a balancing of forces applied to the pistons while also ensuring rigidity of the control device, the twin beams comprising two push rods capable of pushing the pistons and a device for maintaining a separation of points where the forces are applied to the pistons, the maintaining device comprising first and second connecting components, the push rods joined together by the connecting components which are rigid and axially spaced apart from one another, the connecting components hinged to the push rods and a control rod capable of being pushed by the pedal, at least one of the connecting components hinged at a middle area to the control rod, each push rod including a spherical end cooperating with a cavity having a spherical bottom which is formed in the respective piston, and the second connecting component positioned next to the master cylinder and hinged to each push rod with a clearance therebetween.

2. The control device according to claim 1, characterized in that each of the connecting components is formed by two identical components situated on each side of the contol rod and push rods.

3. A control device for a twin master cylinder of the type having two master cylinders situated side by side and parallel to one another, the control device positioned between an actuating pedal and piston of the master cylinders, characterized in that the control device includes twin beams which ensure a balancing of forces applied to the pistons while also ensuring rigidity of the control device, the twin beams comprising two push rods capable of pushing the pistons and a device for maintaining a sparation of points where the forces are applied to the pistons, the maintaining device comprising first and second connecting components, the push rods joined together by the connecting components which are rigid and axially spaced apart from one another, the connecting components hinged to the push rods and a control rod capable of being pushed by the pedal, at least one of the connecting components hinged at a middle area to the control rod, the second connecting component situated next to the master cylinder and hinged without clearance to the control rod and only one of the push rods, each of the push rods including a spherical end cooperating with a cavity having a spherical bottom formed in one of the pistons.

4. The control device according to claim 3, characterized in that each of the connecting components is formed by two identical components situated on each side of the control rod and push rods.

* * * * *